(12) United States Patent
Koishi

(10) Patent No.: US 8,068,392 B2
(45) Date of Patent: Nov. 29, 2011

(54) RECORDING METHOD, RECORDING APPARATUS, AND RECORDING MEDIUM

(75) Inventor: Kenji Koishi, Sanda (JP)

(73) Assignee: Panasonic Corporation, Osaka (JP)

( * ) Notice: Subject to any disclaimer, the term of this patent is extended or adjusted under 35 U.S.C. 154(b) by 1144 days.

(21) Appl. No.: 10/562,756

(22) PCT Filed: Jul. 1, 2004

(86) PCT No.: PCT/JP2004/009706
§ 371 (c)(1),
(2), (4) Date: Aug. 9, 2007

(87) PCT Pub. No.: WO2005/004121
PCT Pub. Date: Jan. 13, 2005

(65) Prior Publication Data
US 2008/0117787 A1    May 22, 2008

(30) Foreign Application Priority Data
Jul. 3, 2003    (JP) .................................. 2003-190966

(51) Int. Cl.
*G11B 7/00*    (2006.01)
(52) U.S. Cl. .................. 369/47.28; 369/47.29; 369/53.1; 369/59.11; 369/53.26; 369/59.12
(58) Field of Classification Search ............... 369/47.28, 369/47.29, 47.53, 53.1, 59.11, 116, 53.26, 369/59.12
See application file for complete search history.

(56) References Cited

U.S. PATENT DOCUMENTS
6,404,713 B1 * 6/2002 Ueki .......................... 369/47.53
(Continued)

FOREIGN PATENT DOCUMENTS
CN    1368723    9/2002
(Continued)

OTHER PUBLICATIONS
Chinese Office Action for corresponding Application No. 2004-800252793 mailed Apr. 9, 2007.
(Continued)

*Primary Examiner* — Van Chow
(74) *Attorney, Agent, or Firm* — Renner, Otto, Boisselle & Sklar, LLP

(57) ABSTRACT

A recording method is provided, which comprises the steps of (a) generating a plurality of pulse sequences corresponding to a plurality of linear velocities, (b) while rotating a recording medium with a linear velocity selected from the plurality of linear velocities, forming at least one of a recording mark and a space by irradiating the recording medium with a pulse sequence selected from the plurality of pulse sequences, the pulse corresponding to the linear velocity. The step (a) comprises the steps of (a-1) measuring at least one first recording parameter corresponding to at least one linear velocity selected from the plurality of linear velocities, (a-2) determining a second recording parameter corresponding to the plurality of linear velocities based on the at least one first recording parameter measured, and (a-3) generating the plurality of pulse sequences corresponding to the plurality of linear velocities based on the second recording parameter measured.

15 Claims, 7 Drawing Sheets

U.S. PATENT DOCUMENTS

| | | | |
|---|---|---|---|
| 6,426,930 B2 | 7/2002 | Tanaka et al. | |
| 6,901,039 B1 * | 5/2005 | Sugie et al. | 369/47.28 |
| 6,944,106 B2 * | 9/2005 | Suzuki | 369/47.53 |
| 2002/0001275 A1 | 1/2002 | Tanaka et al. | |
| 2002/0024903 A1 | 2/2002 | Sato | |
| 2002/0114234 A1 | 8/2002 | Chao et al. | |
| 2002/0150012 A1 | 10/2002 | Hsiao et al. | |
| 2003/0043711 A1 | 3/2003 | Mashimo et al. | |
| 2003/0048713 A1 | 3/2003 | Suzuki | |

FOREIGN PATENT DOCUMENTS

| | | |
|---|---|---|
| EP | 0 556 046 A1 | 8/1993 |
| EP | 0 557 584 A1 | 9/1993 |
| EP | 0 642 128 A1 | 3/1995 |
| EP | 1 331 631 | 7/2003 |
| TW | 501096 | 9/2002 |
| WO | 02/29791 | 4/2002 |

OTHER PUBLICATIONS

European Search Report for corresponding Application No. 04 747 175.0 dated Jun. 6, 2007.

International Search Report for corresponding Application No. PCT/JP2004/009706 mailed Dec. 30, 2004.

Taiwan Office Action for corresponding Taiwan Application No. 093119728 issued Aug. 27, 2010 (with English translation).

* cited by examiner (a)

○ Default values described in CT: PCva, PCvb
△ Initial value before learning: f(v1)
● Optimum value after learning: PMv1

$f(v) = \alpha(v - va) + PCva$
$\alpha = (PCvb - PCva)/(vb - va)$ (b)

□ Approximation values: g(va), g(v2), g(vb)

$g(v) = f(v) + PMv1 - f(v1) + adj(v)$

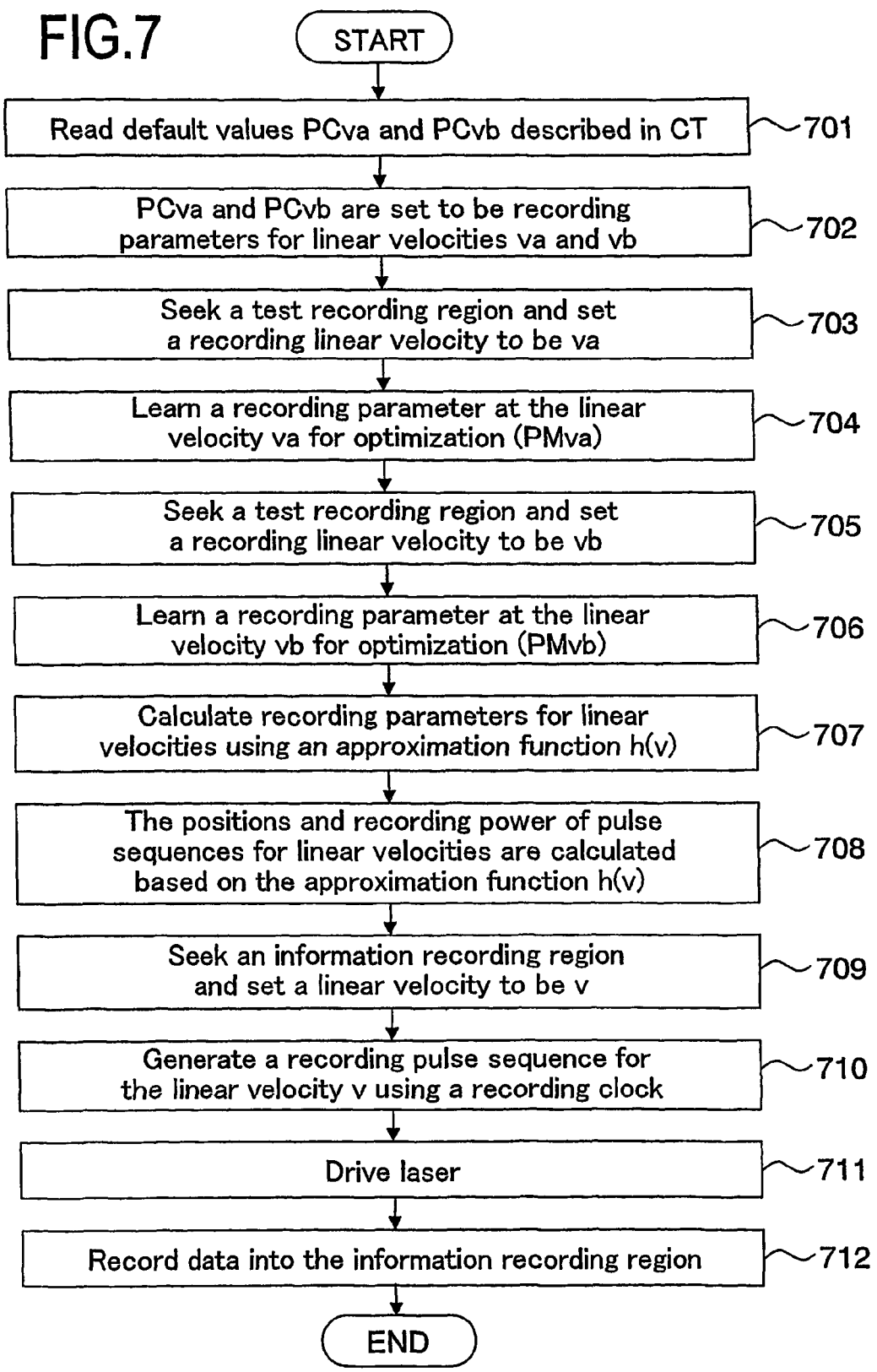

RECORDING METHOD, RECORDING APPARATUS, AND RECORDING MEDIUM

TECHNICAL FIELD

The present invention relates to a recording method and a recording apparatus for forming at least one of a recording mark and a space on a recording medium, by irradiating the recording medium with a sequence of light pulses while rotating the recording medium at a prescribed linear velocity. The present invention also relates to a recording medium storing prescribed information.

BACKGROUND ART

To perform constant angular velocity (CAV) recording of information on an optical disc, recording parameters need to be optimized for each of the successively changing linear velocities. The term "CAV recording" refers to a technique of recording information onto an optical disc, while changing a recording clock, having a period T, depending on a change in linear velocity, so that the linear density of recorded data is constant.

Japanese Laid-Open Publication No. 2001-344754 discloses a method for determining an optimum recording power level for each of successive linear velocities. In this method, test recording is performed at particular linear velocities in advance. Based on the results, an optimum recording power level is calculated for an arbitrary linear velocity.

Japanese Laid-Open Publication No. 2001-118245 discloses a method for calculating an optimum pulse width for an arbitrary linear velocity, based on the widths of a starting pulse and a final cooling pulse contained in a pulse sequence, which has been previously recorded on an optical disc at a prescribed linear velocity.

However, when the method disclosed in Japanese Laid-Open Publication No. 2001-344754 is used to perform CAV recording of information at high density and high speed (e.g., when information is recorded onto DVD-RAM), an optimum recording power level for an arbitrary linear velocity, which is calculated based on the result of test recordings performed in advance at a particular linear velocity, is different from the actual recording power level for the linear velocity.

When the method disclosed in Japanese Laid-Open Publication No. 2001-118245 is used to perform CAV recording of information at high density and high speed (e.g., when information is recorded onto DVD-RAM), an optimum pulse width for an arbitrary linear velocity, which is calculated based on the widths of a starting pulse and a terminating pulse contained in a pulse sequence which has been previously recorded on an optical disc at a prescribed linear velocity, is different from the optimum pulse width for the arbitrary linear velocity.

These differences are caused by variations in optical discs or variations in the diameter of a light spot produced by recording apparatuses. Therefore, the differences occur even when optical discs are produced by the same manufacturer. The differences are significant when CAV recording of information is performed at a high density and a high speed. Therefore, a technique for generating an optimum pulse sequence corresponding to an arbitrary linear velocity for each combination of an optical disc and a recording apparatus is required.

The present invention is provided to solve the above-described problems. An object of the present invention is to provide a recording method and a recording apparatus for producing an optimum pulse sequence, depending on an arbitrary linear velocity, even when CAV recording of information is performed at a high density and a high speed, and a recording medium.

DISCLOSURE OF THE INVENTION

A recording method is provided, which comprises the steps of: (a) generating a plurality of pulse sequences corresponding to a plurality of linear velocities; (b) while rotating a recording medium with a linear velocity selected from the plurality of linear velocities, forming at least one of a recording mark and a space by irradiating the recording medium with a pulse sequence selected from the plurality of pulse sequences, the pulse sequence corresponding to the linear velocity. The step (a) comprises the steps of: (a-1) measuring at least one first recording parameter corresponding to at least one linear velocity selected from the plurality of linear velocities; (a-2) determining a second recording parameter corresponding to the plurality of linear velocities based on the at least one first recording parameter measured; and (a-3) generating the plurality of pulse sequences corresponding to the plurality of linear velocities based on the second recording parameter measured. Thereby, the above-described object is achieved.

The step (a-1) may comprise the step of: measuring the at least one first recording parameter by performing recording parameter learning for learning a recording parameter corresponding to a pulse sequence, wherein the pulse sequence is used for forming a desired recording mark onto the recording medium.

Each of the plurality of pulse sequences may comprise a starting pulse and a terminating pulse, the starting pulse being provided at a beginning thereof and the terminating pulse being provided at the end thereof. The starting pulse is used for forming a starting portion of the recording mark. The terminating pulse is used for forming a terminating portion of the recording mark. The second recording parameter indicates a recording power level of each of the plurality of pulse sequences, a recording power level coefficient for determining a recording power level of each of the plurality of pulse sequences, a position of the starting pulse of each of the plurality of pulse sequences, and a position of the terminating pulse of each of the plurality of pulse sequences.

The plurality of linear velocities may be linear velocities continuously ranging from a first linear velocity va, which is a lowest linear velocity, to a second linear velocity vb, which is a highest linear velocity; and the at least one linear velocity may be the first linear velocity va.

The plurality of linear velocities may be linear velocities continuously ranging from a first linear velocity va, which is a lowest linear velocity, to a second linear velocity vb, which is a highest linear velocity; and the at least one linear velocity may be the second linear velocity vb.

The plurality of linear velocities may be linear velocities continuously ranging from a first linear velocity va, which is a lowest linear velocity, to a second linear velocity vb, which is a highest linear velocity; and the at least one linear velocity may be (va+vb)/2.

The plurality of linear velocities may be linear velocities continuously ranging from a first linear velocity va, which is a lowest linear velocity, to a second linear velocity vb, which is a highest linear velocity; the at least one linear velocity may be a linear velocity v1 and a linear velocity v2; and the first linear velocity va, the second linear velocity vb, the linear velocity v1, and the linear velocity v2 may have a relationship $va \leq v1 < v2 \leq vb$.

The plurality of linear velocities may be linear velocities continuously ranging from a first linear velocity va, which is a lowest linear velocity, to a second linear velocity vb, which is a highest linear velocity; and the at least one linear velocity is a first linear velocity va and a second linear velocity vb.

The plurality of linear velocities may be linear velocities continuously ranging from a first linear velocity va, which is a lowest linear velocity, to a second linear velocity vb, which is a highest linear velocity; the at least one linear velocity may be a linear velocity v1, a linear velocity v2, and a linear velocity v3; and the first linear velocity va, the second linear velocity vb, the linear velocity v1, the linear velocity v2, and the linear velocity v3 may have a relationship $va \leq v1 < v2 < v3 \leq vb$.

The plurality of linear velocities may be linear velocities continuously ranging from a first linear velocity va, which is a lowest linear velocity, to a second linear velocity vb, which is a highest linear velocity; the at least one linear velocity may be a first linear velocity va, a second linear velocity vb, and a third linear velocity vc; and the first linear velocity va, the second linear velocity vb, and the third linear velocity vc may have a relationship $vc=(va+vb)/2$.

The step (a-2) may comprise the steps of: determining a fourth recording parameter corresponding to the plurality of linear velocities based on at least one third recording parameter recorded on the recording medium; and determining the second parameter based on the at least one first recording parameter measured and the fourth recording parameter.

The first recording parameter, the second recording parameter, the third recording parameter, and the fourth recording parameter may have a relationship represented by:

$$g(v)=f(v)+PMv1-f(v1)+Adj(v),$$

where:
v represents the plurality of linear velocities;
v1 represents a linear velocity corresponding to one of the at least one third recording parameter;
g(v) represents the second recording parameter corresponding to the plurality of linear velocities;
f(v) represents the fourth recording parameter corresponding to the plurality of linear velocities;
PMv1 represents the first recording parameter; and
Adj (v) represents an adjustment value corresponding to the plurality of linear velocities.

The plurality of linear velocities may be linear velocities continuously ranging from a first linear velocity va, which is a lowest linear velocity, to a second linear velocity vb, which is a highest linear velocity; the at least one third recording parameter may be a recording parameter corresponding to a linear velocity v1 of the plurality of linear velocities and a recording parameter corresponding to a linear velocity v2 of the plurality of linear velocities; and the first linear velocity va, the second linear velocity is vb, the linear velocity v1, and the linear velocity v2 may have a relationship $va \leq v1 < v2 \leq vb$.

The plurality of linear velocities may be linear velocities continuously ranging from a first linear velocity va, which is a lowest linear velocity, to a second linear velocity vb, which is a highest linear velocity; and the at least one third recording parameter may be a recording parameter corresponding to the first linear velocity va and a recording parameter corresponding to the second linear velocity vb.

The plurality of linear velocities may be linear velocities continuously ranging from a first linear velocity va, which is a lowest linear velocity, to a second linear velocity vb, which is a highest linear velocity; the at least one third recording parameter may be a recording parameter corresponding to a linear velocity v1 of the plurality of linear velocities, a recording parameter corresponding to a linear velocity v2 of the plurality of linear velocities, and a recording parameter corresponding to a linear velocity v3 of the plurality of linear velocities; and the first linear velocity va, the second linear velocity vb, the linear velocity v1, the linear velocity v2, and the linear velocity v3 may have a relationship $va \leq v1 < v2 < v3 \leq vb$.

The plurality of linear velocities may be linear velocities continuously ranging from a first linear velocity va, which is a lowest linear velocity, to a second linear velocity vb, which is a highest linear velocity: the at least one third recording parameter may be a recording parameter corresponding to the first linear velocity va, a recording parameter corresponding to the second linear velocity vb, and a recording parameter corresponding to a linear velocity vc of the plurality of linear velocities; and the first linear velocity va, the second linear velocity vb, and the third linear velocity vc may have a relationship $vc=(va+vb)/2$.

f(v) may be a linear function or a quadratic function.

The plurality of linear velocities may be linear velocities continuously ranging from a first linear velocity va, which is a lowest linear velocity, to a second linear velocity vb, which is a highest linear velocity; the at least one third recording parameter may be a recording parameter PCv1 corresponding to a linear velocity v1 of the plurality of linear velocities and a recording parameter PCv2 corresponding to a linear velocity v2 of the plurality of linear velocities; and the following relationship may be satisfied:

$$va \leq v1 < v2 \leq vb,$$

$$f(v)=\alpha \cdot (v-v1)+PCv1,$$

and $$\alpha=(PCv2-PCv1)/(v2-v1).$$

The at least one third recording parameter may be selected based on an identification code recorded on the recording medium.

The at least one linear velocity of the plurality of linear velocities may be at least one linear velocity corresponding to at least one third recording parameter; and the step (a-2) may comprises the step of determining a second recording parameter h(v) corresponding to the plurality of linear velocities v based on the at least one first recording parameter measured.

The plurality of linear velocities may be linear velocities continuously ranging from a first linear velocity va, which is a lowest linear velocity, to a second linear velocity vb, which is a highest linear velocity; at least one linear velocity of the plurality of linear velocities may be a linear velocity v1 and a linear velocity v2; and the first linear velocity va, the second linear velocity vb, the linear velocity v1, and the linear velocity v2 may have a relationship $va \leq v1 < v2 \leq vb$.

The plurality of linear velocities may be linear velocities continuously ranging from a first linear velocity va, which is a lowest linear velocity, to a second linear velocity vb, which is a highest linear velocity; and at least one linear velocity of the plurality of linear velocities may be the first linear velocity va and the second linear velocity vb.

The plurality of linear velocities may be linear velocities continuously ranging from a first linear velocity va, which is a lowest linear velocity, to a second linear velocity vb, which is a highest linear velocity; at least one linear velocity of the plurality of linear velocities may be a linear velocity v1, a linear velocity v2, and a linear velocity v3; and the first linear velocity va, the second linear velocity vb, the linear velocity v1, the linear velocity v2, and the linear velocity v3 have a relationship va≦v1<v2<v3≦vb.

The plurality of linear velocities may be linear velocities continuously ranging from a first linear velocity va, which is a lowest linear velocity, to a second linear velocity vb, which is a highest linear velocity; at least one linear velocity of the plurality of linear velocities may be the first linear velocity va, the second linear velocity vb, and the linear velocity vc; and the first linear velocity va, the second linear velocity vb, and the third linear velocity vc may have a relationship vc=(va+vb)/2.

h(v) may be a linear function or a quadratic function.

The plurality of linear velocities may be linear velocities continuously ranging from a first linear velocity va, which is a lowest linear velocity, to a second linear velocity vb, which is a highest linear velocity; the at least one first recording parameter may be a recording parameter PMv1 corresponding to a linear velocity v1 of the plurality of linear velocities and a recording parameter PMv2 corresponding a linear velocity v2 of the plurality of linear velocities; and the following relationship may be satisfied:

$$va \leq v1 < v2 \leq vb,$$

$$h(v) = \beta \cdot (v-va) + PMv1,$$

and $$\beta = (PMv2 - PMv1)/(v2-v1).$$

The at least one third recording parameter may be selected based on an identification code recorded on the recording medium.

The recording power level coefficient may be at least one of a coefficient for determining an erase power level of an erase pulse forming the space based on a peak power level of a peak pulse contained in a pulse sequence, and a coefficient for determining a bias power level of a bias pulse forming the recording mark based on the peak power level of the peak pulse contained in the pulse sequence. The bias power level is between the peak power level and the erase power level.

Each of the plurality of pulse sequences may comprise a starting pulse and a terminating pulse, the starting pulse being provided at a beginning thereof and the terminating pulse being provided at the end thereof. The recording mark may be a shortest recording mark. The starting pulse and the terminating pulse may be pulses forming the shortest recording mark. Adj(v) may be determined based on a position of at least one of the starting pulse and the terminating pulse.

A recording medium for recording information is provided. At least one of a recording mark and a space is formed on the recording medium by, while rotating the recording medium with a linear velocity selected from the plurality of linear velocities, irradiating the recording medium with a pulse sequence selected from the plurality of pulse sequences, the pulse sequence corresponding to the linear velocity. The plurality of pulse sequences correspond to the plurality of linear velocities. At least one first recording parameter corresponding to at least one linear velocity of the plurality of linear velocities is measured. A fourth recording parameter corresponding to the plurality of linear velocities is determined based on at least one third recording parameter recorded on the recording medium. A second parameter is determined based on the at least one first recording parameter measured and the fourth recording parameter. The plurality of pulse sequences corresponding to the plurality of linear velocities are generated based on the determined second recording parameter. The recording medium has a region, in which the third recording parameter is recorded. The first recording parameter, the second recording parameter, the third recording parameter, and the fourth recording parameter have a relationship represented by:

$$g(v) = f(v) + PMv1 - f(v1) + Adj(v)$$

where:

v represents the plurality of linear velocities;

v1 represents a linear velocity corresponding to one of the at least one third recording parameter;

g(v) represents the second recording parameter corresponding to the plurality of linear velocities;

f(v) represents the fourth recording parameter corresponding to the plurality of linear velocities;

PMv1 represents the first recording parameter; and

Adj (v) represents an adjustment value corresponding to the plurality of linear velocities. Thereby, the above-described object is achieved.

A recording medium for recording information is provided. At least one of a recording mark and a space is formed on the recording medium by, while rotating the recording medium with a linear velocity selected from the plurality of linear velocities, irradiating the recording medium with a pulse sequence selected from the plurality of pulse sequences, the pulse sequence corresponding to the linear velocity. The plurality of pulse sequences correspond to the plurality of linear velocities. At least one first recording parameter corresponding to at least one linear velocity of the plurality of linear velocities is measured. At least one linear velocity of the plurality of linear velocities is at least one linear velocity corresponding to at least one third recording parameter recorded on the recording medium. A second recording parameter corresponding to the plurality of linear velocities is determined based on the at least one first recording parameter measured. The plurality of pulse sequences corresponding to the plurality of linear velocities are generated based on the second recording parameter measured. The recording medium has a region, in which the third recording parameter is recorded. Thereby, the above-described object is achieved.

The recording medium may have a region, in which an identification code for selecting the at least one third recording parameter is recorded.

A recording apparatus is provided, which comprises: means for generating a plurality of pulse sequences corresponding to a plurality of linear velocities; means for, while rotating a recording medium with a linear velocity selected from the plurality of linear velocities, forming at least one of a recording mark and a space by irradiating the recording medium with a pulse sequence selected from the plurality of pulse sequences, the pulse sequence corresponding to the linear velocity. The forming means comprises: means for measuring at least one first recording parameter corresponding to at least one linear velocity selected from the plurality of linear velocities; means for determining a second recording parameter corresponding to the plurality of linear velocities based on the at least one first recording parameter measured; and means for generating the plurality of pulse sequences corresponding to the plurality of linear velocities based on the second recording parameter measured.

The plurality of linear velocities may be linear velocities continuously ranging from a first linear velocity va, which is a lowest linear velocity, to a second linear velocity vb, which is a highest linear velocity; and the at least one linear velocity may be a first linear velocity va and a second linear velocity vb.

At least one linear velocity of the plurality of linear velocities may be at least one linear velocity corresponding to at least one third recording parameter recorded on the recording medium. The second recording parameter determining means may determine a second recording parameter h(v) corresponding to the plurality of linear velocities v based on the at least one first recording parameter measured. The plurality of linear velocities may be linear velocities continuously ranging from a first linear velocity va, which is a lowest linear velocity, to a second linear velocity vb, which is a highest linear velocity; at least one linear velocity of the plurality of linear velocities corresponding to at least one third recording parameter recorded on the recording medium may be a linear velocity v1 and a linear velocity v2; and the first linear velocity va, the second linear velocity vb, the linear velocity v1, and the linear velocity v2 may have a relationship va≦v1<v2≦vb.

At least one linear velocity of the plurality of linear velocities may be at least one linear velocity corresponding to at least one third recording parameter recorded on the recording medium. The second recording parameter determining means may determine a second recording parameter h(v) corresponding to the plurality of linear velocities v based on the at least one first recording parameter measured. The plurality of linear velocities may be linear velocities continuously ranging from a first linear velocity va, which is a lowest linear velocity, to a second linear velocity vb, which is a highest linear velocity; and the at least one linear velocity corresponding to the at least one third recording parameter may be the first linear velocity va and the second linear velocity vb.

At least one linear velocity of the plurality of linear velocities may be at least one linear velocity corresponding to at least one third recording parameter recorded on the recording medium. The second recording parameter determining means may determine a second recording parameter h(v) corresponding to the plurality of linear velocities v based on the at least one first recording parameter measured. h(v) may be a linear function or a quadratic function.

At least one linear velocity of the plurality of linear velocities may be at least one linear velocity corresponding to at least one third recording parameter recorded on the recording medium. The second recording parameter determining means may determine a second recording parameter h(v) corresponding to the plurality of linear velocities v based on the at least one first recording parameter measured. The plurality of linear velocities may be linear velocities continuously ranging from a first linear velocity va, which is a lowest linear velocity, to a second linear velocity vb, which is a highest linear velocity; the at least one first recording parameter may be a recording parameter PMv1 corresponding to a linear velocity v1 of the plurality of linear velocities and a recording parameter PMv2 corresponding a linear velocity v2 of the plurality of linear velocities; and the following relationship may be satisfied:

$$va \leq v1 < v2 \leq vb,$$

$$h(v) = \beta \cdot (v - va) + PMv1,$$

and $$\beta = (PMv2 - PMv1)/(v2 - v1).$$

BRIEF DESCRIPTION OF THE DRAWINGS

FIG. 7 is a flowchart showing a second procedure for optimizing a recording parameter.

BEST MODE FOR CARRYING OUT THE INVENTION

Hereinafter, the present invention will be described by way of illustrative examples with reference to the accompanying drawings.

1. Configuration of a Recording/Reproduction Apparatus 100

Figure 1:
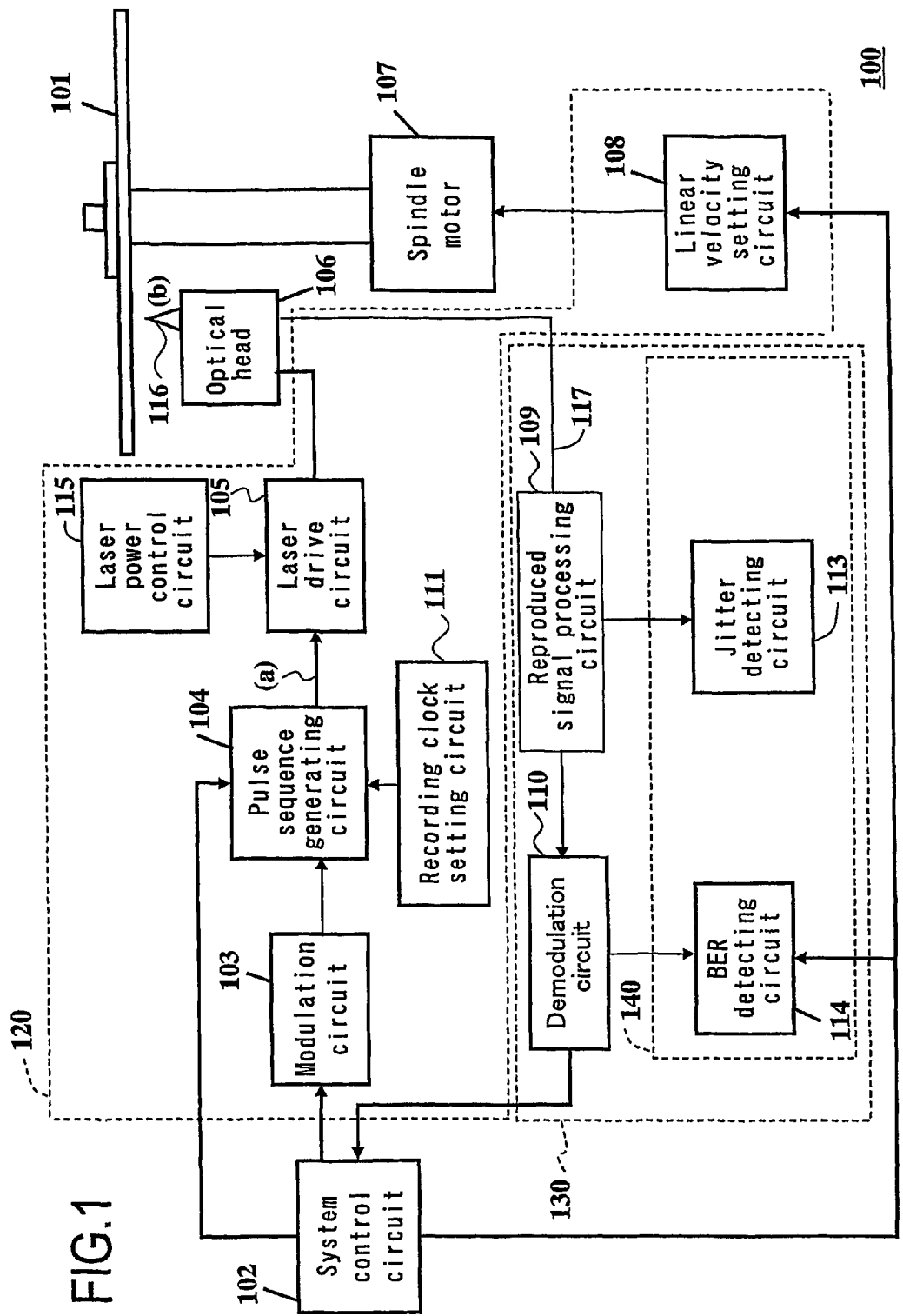
FIG. 1 is a diagram showing a configuration of a recording/reproduction apparatus 100 according to an embodiment of the present invention.

FIG. 1 is a diagram showing a recording/reproduction apparatus 100 according to an embodiment of the present invention.

The recording/reproduction apparatus 100 is configured so that a recording medium 101 for recording/reproducing data (hereinafter referred to as "optical disc 101") can be loaded therein.

The recording/reproduction apparatus 100 comprises an optical head 106, a spindle motor 107, a system control circuit 102, a recording circuitry 120, and a reproduction circuitry 130.

The system control circuit 102 controls operations of components contained in the recording/reproduction apparatus 100. The optical head 106 focuses light emitted by a semiconductor laser, and emits the focused light toward the optical disc 101. The spindle motor 107 drives and rotates the optical disc 101.

The recording circuitry 120 comprises a modulation circuit 103, a pulse sequence generating circuit 104, a recording clock setting circuit 111, a laser drive circuit 105, and a linear velocity setting circuit 108.

The modulation circuit 103 converts data, which is to be recorded onto the optical disc 101, to a binary modulated code.

The clock setting circuit 111 sets a clock of the pulse sequence generating circuit 104, depending on the linear velocity of the optical disc 101.

The pulse sequence generating circuit 104 generates a pulse sequence based on a modulated code. For example, the pulse sequence generating circuit 104 corrects the position of a starting pulse provided at the beginning of a pulse sequence, and the position of a terminating pulse provided at the end of a recording pulse sequence. The details of the pulse sequence generating circuit 104 will be described below.

A laser power control circuit 115 controls a recording power level of a pulse sequence. The details of the laser power control circuit 115 will be described below.

The laser drive circuit 105 drives a current for a semiconductor laser apparatus mounted on the optical head 106, based on a pulse sequence generated by the pulse sequence generating circuit 104 and a power level controlled by the laser power control circuit 115.

The linear velocity setting circuit 108 controls the rotational speed of the spindle motor 107 so as to set a linear velocity of the optical disc 101. The linear velocity of the optical disc 101 continuously ranges, for example, from a first linear velocity va (lowest linear velocity) to a second linear velocity vb (highest linear velocity).

The reproduction circuitry 130 comprises a reproduced signal processing circuit 109, a demodulation circuit 110, and a detection circuitry 140.

The reproduced signal processing circuit 109 processes a signal reproduced by the optical head 106, e.g., converts the reproduced signal into a binary form and reproduces a clock signal from the reproduced signal. The demodulation circuit 110 decodes the binary reproduced signal to produce reproduced data.

The detection circuitry 140 optimizes recording parameters, i.e., the positions of pulses contained in a pulse sequence and the recording power levels of pulses in a pulse sequence. The detection circuitry 140 comprises a jitter detecting circuit 113 and a BER detecting circuit 114. The jitter detecting circuit 113 detects a jitter value of a reproduced signal. The BER detecting circuit 114 detects a bit error rate of a demodulated reproduced signal.

Note that a one-chip LSI may comprise at least one of the recording circuitry 120 and the reproduction circuitry 130. A one-chip LSI may comprise the recording circuitry 120, the reproduction circuitry 130, and the system control circuit 102. When at least one of the recording circuitry 120 and the reproduction circuitry 130 is contained in a one-chip LSI, or the recording circuitry 120, the reproduction circuitry 130, and the system control circuit 102 are contained in a one-chip LSI, the production of the recording/reproduction apparatus 100 can become easier.

Figure 2:
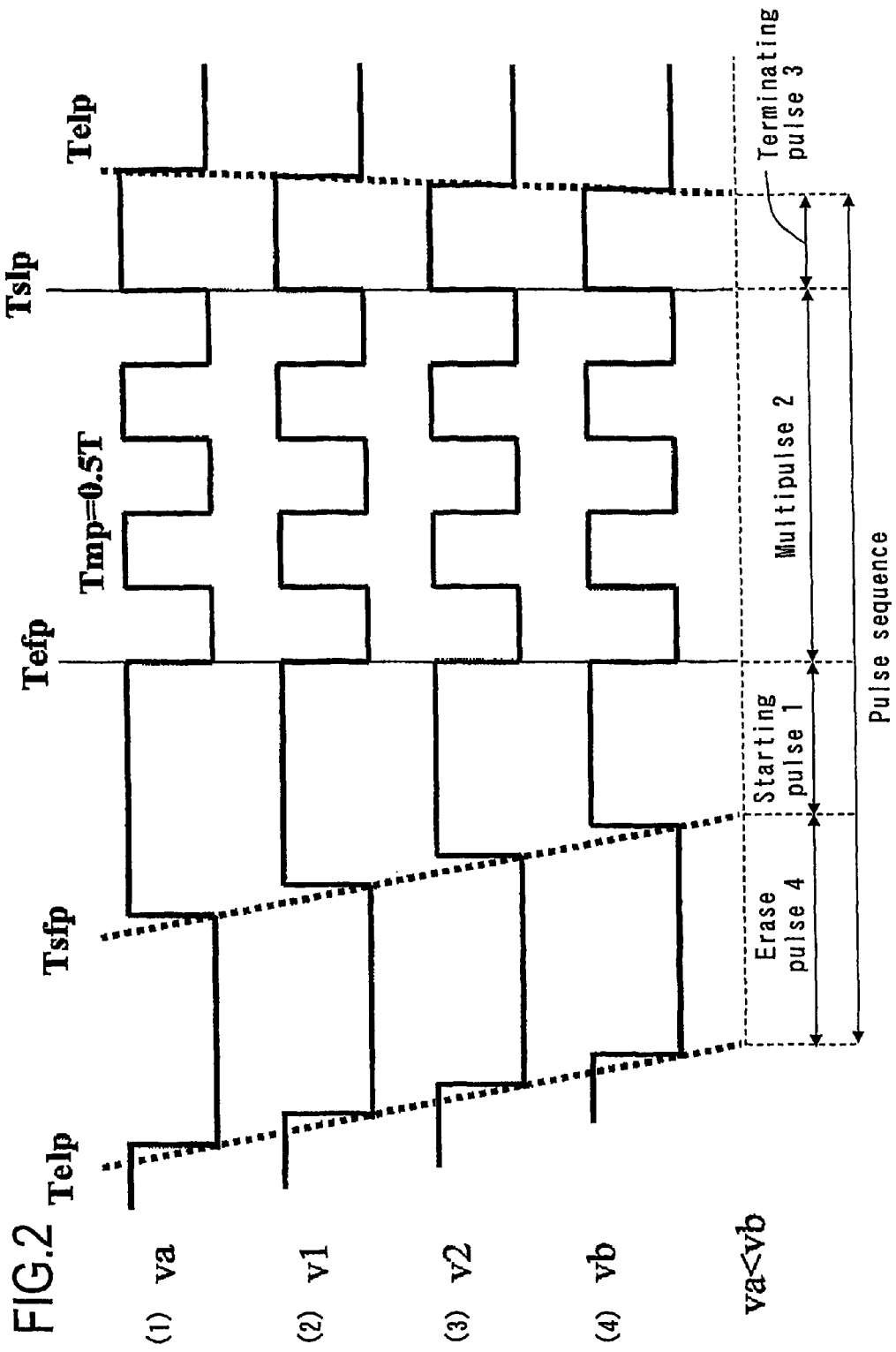
FIG. 2 is a diagram showing a pulse sequence corresponding to a linear velocity, where T is a unit period of a recording clock.

FIG. 2 is a diagram showing a pulse sequence corresponding to a linear velocity.

Portion (1) of FIG. 2 shows a pulse sequence corresponding to the lowest linear velocity va. Portion (2) of FIG. 2 shows a pulse sequence corresponding to a linear velocity v1. Portion (3) of FIG. 2 shows a pulse sequence corresponding to a linear velocity v2. Portion (4) of FIG. 2 shows a pulse sequence corresponding to a highest linear velocity vb.

The pulse sequences of FIG. 2 are observed at an output (a) of the pulse sequence generating circuit 104 (FIG. 1). A pulse sequence corresponding to a linear velocity contains a plurality of pulses. The pulse width of each pulse of FIG. 2 is normalized with a period T of a recording clock. When the absolute value of a pulse width is proportional to the period T of the recording clock, the pulse width of a pulse sequence corresponding to a linear velocity is represented to be the same.

A pulse sequence contains a starting pulse 1, a multipulse 2, a terminating pulse 3, and an erase pulse 4. The starting pulse 1, the multipulse 2, and the terminating pulse 3 are used for formation of a recording mark. The erase pulse 4 is used for formation of a space.

The starting pulse 1 is provided at the beginning of a pulse sequence. The starting pulse 1 is used for formation of a beginning portion of a recording mark. The terminating pulse 3 is provided at the end of a pulse sequence. The terminating pulse 3 is used for formation of an end portion of a recording mark. The multipulse 2 is provided between the starting pulse 1 and the terminating pulse 2. The multipulse 2 is used for formation of a middle portion of a recording mark. Tmp indicates a width of each pulse contained in the multipulse 2. T indicates a period of a recording clock. In this case, a duty ratio of the multipulse 2 is 0.5 T, i.e., the width Tmp=0.5 T.

Tsfp indicates a rising position of the starting pulse 1. Tefp indicates a falling position of the starting pulse 1. The position of the starting pulse 1 is determined by at least one of the position Tsfp and the position Tefp.

Tslp indicates a rising position of the terminating pulse 3. Telp indicates a falling position of the terminating pulse 3. The position of the terminating pulse 3 is determined by at least one of the position Tslp and the position Telp.

In FIG. 2, the position Tefp, the position Tslp, and the width Tmp are proportional to the period T of the recording clock. Alternatively, they are changed depending on a linear velocity, as with the position Tsfp and the position Telp.

Hereinafter, a function of the pulse sequence generating circuit 104 will be described with reference to FIGS. 1 and 2.

The pulse sequence generating circuit 104 controls at least one of the position Tefp, the position Tslp, the position Tsfp, the position Telp, and the width Tmp, depending on a linear velocity, so as to produce a pulse sequence forming an appropriate recording mark and an appropriate space.

For example, the pulse sequence generating circuit 104 optimizes the position Tsfp and the position Telp of a pulse sequence corresponding to at least one of a plurality of linear velocities, so as to generate a pulse sequence forming an appropriate recording mark and an appropriate space. For example, the pulse sequence generating circuit 104 optimizes the position Tsfp, depending on a mark length of a recording mark formed by a pulse sequence and a space length of a space adjacent to a front of the recording mark, and optimizes the position Telp, depending on a mark length of a recording mark formed by a pulse sequence and a space length of a space adjacent to a rear of the recording mark.

For example, the degree of optimization of the position Tsfp and the position Telp (optimization index) can be determined by using at least one of the jitter detecting circuit 113 and the BER detecting circuit 114. For example, the pulse sequence generating circuit 104, changes the position Tsfp and the position Telp in a manner to minimize the jitter value or the BER value of a reproduced signal.

Figure 3:
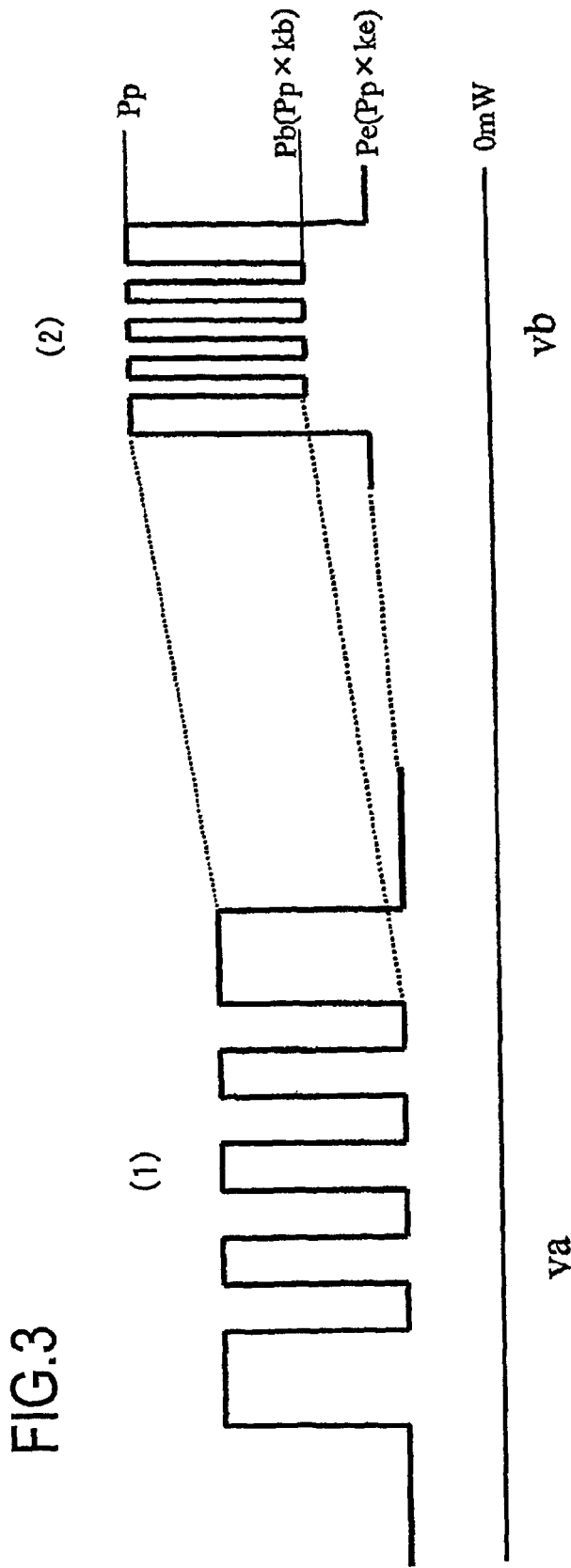
FIG. 3 is a diagram showing absolute values of recording power levels possessed by pulse sequences (unit: mW).

FIG. 3 is a diagram showing absolute values of recording power levels possessed by pulse sequences (unit: mW).

Portion (1) of FIG. 3 shows an absolute value of a recording power level possessed by a pulse sequence corresponding to the lowest linear velocity va (unit: mW). Portion (2) of FIG. 3 shows an absolute value of a recording power level possessed by a pulse sequence corresponding to the highest linear velocity vb (unit: mW).

The pulse sequences of FIG. 3 are observed in an output light (b) of the optical head 106 (FIG. 1).

The recording power level of the pulse sequence contains a peak power level Pp, a bias power level Pb, and an erase power level Pe. For example, the peak power level Pp, the bias power level Pb, and the erase power level Pe satisfy the relationship Pe≦Pb≦Pp.

The peak power level Pp is a peak power level of a pulse sequence. For example, the peak power level Pp is a peak power level of the starting pulse 1. Alternatively, the peak power level Pp is a peak power level of the terminating pulse 3.

The bias power level Pb is a bias power level of a pulse sequence. For example, the bias power level Pb is a power level between pulses contained in the multipulse 2. For example, the bias power level Pb may be determined based on the peak power level Pp and a recording power level coefficient kb. For example, the bias power level Pb, the peak power level Pp, and the recording power level coefficient kb have the relationship Pb=kb×Pp. Note that kb is a multiplication coefficient.

The erase power level Pe is an erase power level of a pulse sequence. For example, the erase power level Pe is a power level of the erase pulse 4. For example, the erase power level Pe may be determined based on the peak power level Pp and a recording power level coefficient ke. For example, the erase power level Pe, the peak power level Pp, and the recording power level coefficient ke have the relationship Pe=ke×Pp. Note that ke is a multiplication coefficient.

Note that the recording power level coefficients are not limited to multiplication coefficients. The recording power level coefficients may be an arbitrary approximation function having the peak power level Pp as a parameter. The references of the recording power level coefficients are not limited to the peak power level Pp. The references of the recording power level coefficients may be the erase power level Pe or the bias power level Pb.

The bias power level Pb is not limited to a bottom power level, which is a power level between pulses contained in the multipulse 2 of FIG. 3. When Tmp=0 (no multipulse), the bias power level Pb may be a power level of a flat portion. The bias power level Pb may be an erase power level of a cooling pulse, which is generated from the falling position of a terminating pulse, extending over a prescribed width.

Hereinafter, a function of the laser power control circuit 115 will be described with reference to FIGS. 1 and 3.

The laser power control circuit 115 controls at least one of the peak power level Pp, the erase power level Pe, the bias power level Pb, and the recording power level coefficient k, depending on a linear velocity, to determine a recording power level of a pulse sequence forming an appropriate recording mark and an appropriate space.

For example, the laser power control circuit 115 optimizes the peak power level Pp, the erase power level Pe, the bias power level Pb, and the recording power level coefficient k by recording parameter learning, so as to determine a recording power level of a pulse sequence forming an appropriate recording mark and an appropriate space.

For example, the degree of optimization of the recording power level and the recording power level coefficient (optimization index) can be determined by using at least one of the jitter detecting circuit 113 and the BER detecting circuit 114. For example, the pulse sequence generating circuit 104 changes the recording power level and the recording power level coefficient in a manner to minimize the jitter value or the BER value of a reproduced signal.

An embodiment of the present invention has been heretofore described with reference to FIGS. 1 to 3.

For example, in the embodiment shown in FIGS. 1 to 3, the system control circuit 102, the pulse sequence generating circuit 104, the laser power control circuit 115, the laser drive circuit 105, and the reproduction circuitry 130, constitute a "pulse sequence generating means for generating a plurality of pulse sequences corresponding to a plurality of linear velocities". The system control circuit 102, the laser drive circuit 105, the optical head 106, and the spindle motor 107, constitute a "formation means for, while rotating a recording medium with a linear velocity selected from a plurality of linear velocities, forming at least one of a recording mark and a space by irradiating the recording medium with a pulse sequence selected from a plurality of pulse sequences, the pulse sequence corresponding to the linear velocity". The reproduction circuitry 130 corresponds to a "first recording parameter measuring means for measuring at least one first recording parameter corresponding to at least one of a plurality of linear velocities". The system control circuit 102, the pulse sequence generating circuit 104, the laser power control circuit 115, and the laser drive circuit 105, constitute a "second recording parameter determining means for determining a second recording parameter corresponding to a plurality of linear velocities based on the at least one first recording parameter measured" and a "means for generating a plurality of pulse sequences corresponding to a plurality of linear velocities based on the determined second recording parameter".

However, the recording/reproduction apparatus 100 of the present invention is not limited to the embodiment of FIGS. 1 to 3. The recording/reproduction apparatus 100 of the present invention has any configuration as long as it comprises the above-described "pulse sequence generating means for generating a plurality of pulse sequences corresponding to a plurality of linear velocities", "formation means for, while rotating a recording medium with a linear velocity selected from a plurality of linear velocities, forming at least one of a recording mark and a space by irradiating the recording medium with a pulse sequence selected from a plurality of pulse sequences, the pulse sequence corresponding to the linear velocity", "first recording parameter measuring means for measuring at least one first recording parameter corresponding to at least one of a plurality of linear velocities", "second recording parameter determining means for determining a second recording parameter corresponding to a plurality of linear velocities based on the at least one first recording parameter measured", and "means for generating a plurality of pulse sequences corresponding to a plurality of linear velocities based on the determined second recording parameter".

According to the recording method, the recording apparatus and the recording medium of the present invention, it is possible to generate a correct pulse sequence quickly. This is because the present invention does not rely only on measured recording parameters, which are correct and requires a long time to measure, and the present invention does not rely only on recording parameters already recorded on a recording medium, which are not correct and require no measurement time.

2. Optimization of Recording Parameters by a First Procedure

Figure 4:
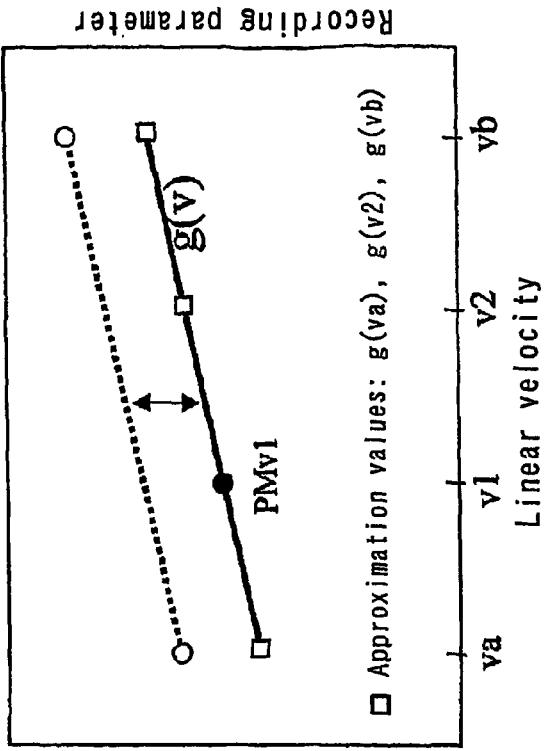
FIG. 4 is a diagram showing a relationship between a linear velocity and a recording parameter to be optimized by a first procedure.
Figure 4:
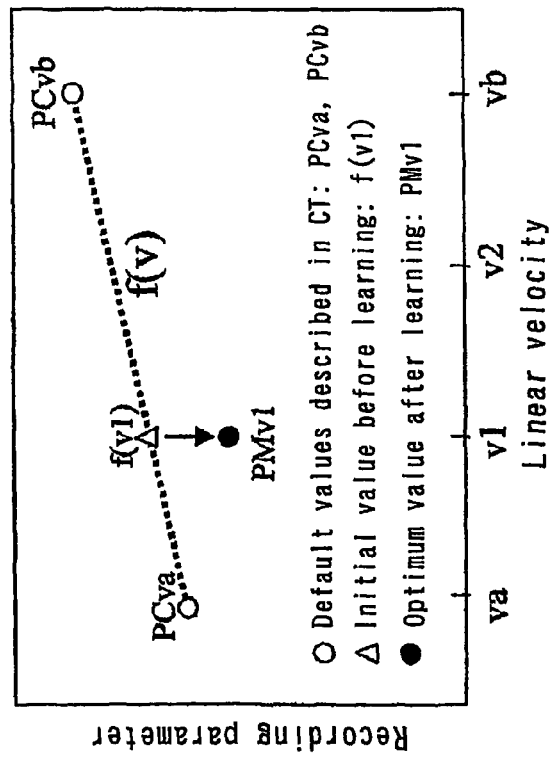

FIG. 4 is a diagram showing a relationship between a linear velocity and a recording parameter to be optimized by a first procedure. Portion (a) of FIG. 4 shows a relationship between the linear velocity and the recording parameter before optimization using the first procedure. Portion (b) of FIG. 4 shows a relationship between the linear velocity and the recording parameter after optimization using the first procedure.

Figure 5:
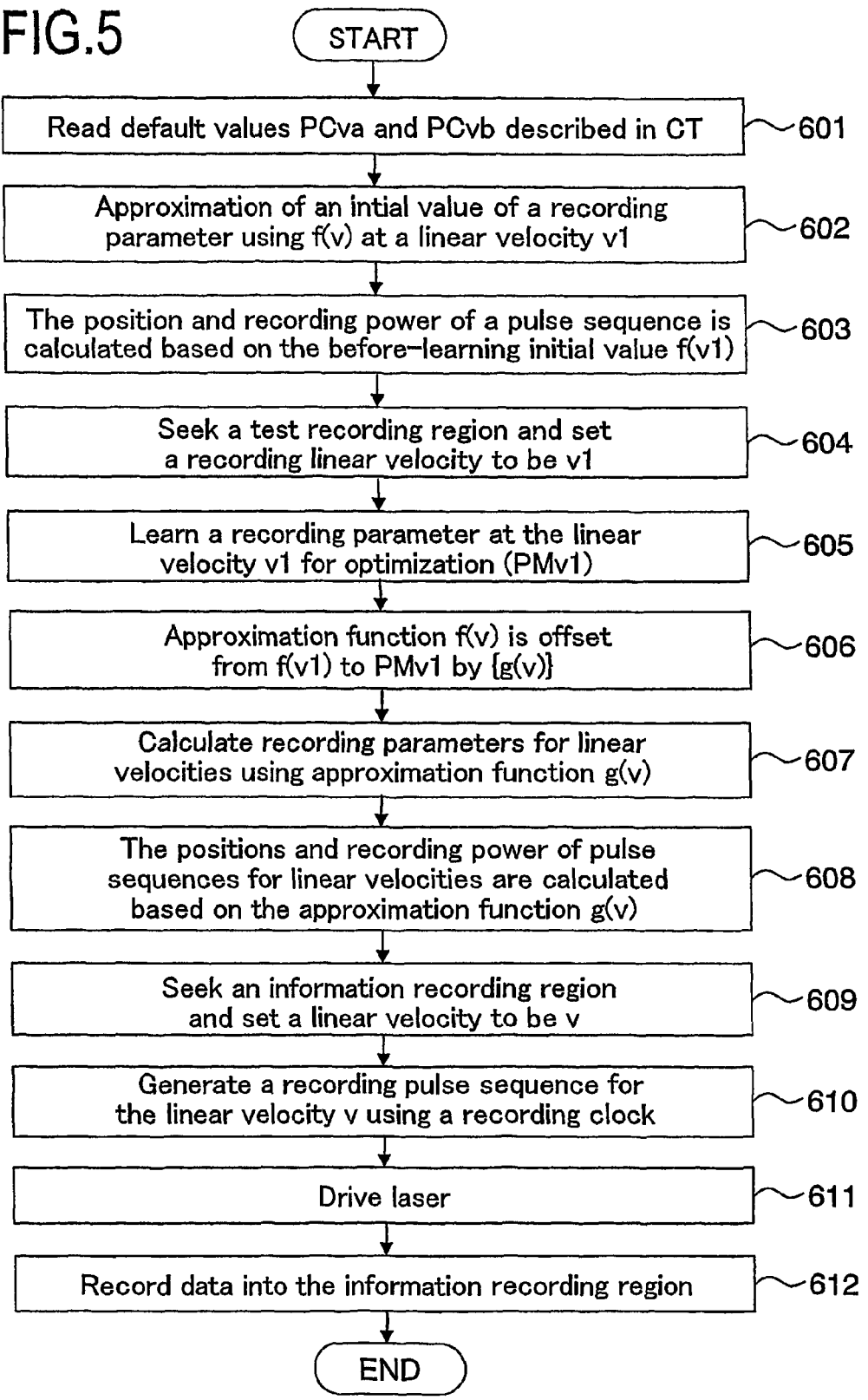
FIG. 5 is a flowchart showing a first procedure for optimizing a recording parameter.

FIG. 5 is a flowchart showing the first procedure for optimizing a recording parameter. The first procedure is executed by the recording/reproduction apparatus 100.

Hereinafter, the first procedure for optimizing a recording parameter will be described step by step with reference to FIGS. 1, 4 and 5.

In step 601: Values described in a control track are read and transferred to a memory region of the system control circuit 102. The values described in the control track are, for example, recording parameters recorded in a control track (CT) region possessed by the optical disc 101 (e.g., at least one of a position and a recording power level of a pulse sequence).

The recording parameters previously recorded in the control track (CT) region are, for example, a recording parameter PCva corresponding to the lowest linear velocity va and a recording parameter PCvb corresponding to the highest linear velocity vb.

Note that the recording parameters previously recorded in the control track (CT) region are not limited to the recording parameter PCva and the recording parameter PCvb. The recording parameters previously recorded in the control track (CT) region are, for example, the recording parameter PCva, the recording parameter PCvb, and a recording parameter PCvc. The recording parameter PCvc is a recording parameter corresponding to a linear velocity vc (vc=(va+vb)/2).

Also, the recording parameters previously recorded in the control track (CT) region may be optional recording parameters corresponding to n linear velocities. For example, the previously recorded recording parameters may be recording parameters corresponding to three linear velocities (v1, v2, v3). In this case, for example, va≦v1<v2<v3≦vb is satisfied. In addition, a recording parameter approximation function f(v) may be previously recorded in the control track (CT) region. The details of the recording parameter approximation function f(v) will be described below.

The recording parameters previously recorded in the control track (CT) region themselves may not be read. Instead, recording parameters corresponding to linear velocities stored in the system control circuit 102 or the like may be selected based on identification codes previously recorded in the control track (CT) region. The identification code may be given for each disk type, or each production lot of each medium maker, in order to select an optimum recording parameter for each disk type or each production lot of each medium maker.

In step 602: Based on PCva and PCvb, a before-learning initial value f(v1) for performing recording parameter learning is calculated. f(v1) indicates a value corresponding to v1. The recording parameter approximation function f(v) is represented by:

$$f(v)=\alpha \cdot (v-va)+PCva$$

$$\alpha=(PCvb-PCva)/(vb-va).$$

The recording parameter approximation function f(v) matches a characteristic of a recording medium. For example, the recording parameter approximation function f(v) can perform a linear approximation of a recording parameter, depending on a linear velocity. However, the recording parameter approximation function f(v) is not limited to a linear function. The recording parameter approximation function f(v) may be a quadratic function. The recording parameter approximation function f(v) may be selected, depending on a characteristic of a recording medium.

The before-learning initial value f(v1) is present on a line drawn by the recording parameter approximation function f(v) (portion (a) of FIG. 4).

In step 603: The before-learning initial value f(v1), which is a recording parameter, is set in the recording/reproduction apparatus 100. For example, the positions of pulses contained in a pulse sequence corresponding to the linear velocity v1 (e.g., the position of the starting pulse, or the position of the terminating pulse) are set in the pulse sequence generating circuit 104. The recording power level of the pulse sequence corresponding to the linear velocity v1 is set in the laser power control circuit 115.

In step 604: The optical head 106 is moved to seek a prescribed test recording region provided on the optical disc 101. The rotational speed of the spindle motor 107 is set to be the linear velocity v1. The linear velocity v1 is used for the recording parameter learning, and is set by the linear velocity setting circuit 108.

Further, the clock setting circuit 111 generates a recording clock Tv1 corresponding to the linear velocity v1, and inputs the recording clock Tv1 to the pulse sequence generating circuit 104.

In step 605: The linear velocity v1 is used to perform recording parameter learning to optimize the recording parameter.

To optimize a pulse sequence corresponding to the linear velocity v1, the pulse sequence generating circuit 104 changes the rising position Tsfp of the starting pulse and the falling position Telp of the terminating pulse.

The pulse sequence generating circuit 104 optimizes the position Tsfp based on the mark length of a recording mark formed by a pulse sequence and the space length of a space adjacent to the front of the recording mark. The pulse sequence generating circuit 104 also optimizes the position Telp based on the mark length of a recording mark formed by a pulse sequence and the space length of a space adjacent to the rear of the recording mark.

The degree (optimization index) of optimization of the position Tsfp and the position Telp can be determined by using at least one of the jitter detecting circuit 113 and the BER detecting circuit 114. For example, the pulse sequence generating circuit 104 changes the position Tsfp and the position Telp in a manner to minimize the jitter value or the BER value of a reproduced signal.

The laser power control circuit 115 optimizes the peak power level Pp, the erase power level Pe, the bias power level Pb, and the recording power level coefficient k, by recording parameter learning, so as to determine a recording power level of a pulse sequence forming an appropriate recording mark and an appropriate space.

The degree of optimization of the recording power levels and the recording power level coefficient (optimization index) can be determined by using at least one of the jitter detecting circuit 113 and the BER detecting circuit 114. The pulse sequence generating circuit 104 changes the recording power levels and the recording power level coefficient in a manner to minimize the jitter value or the BER value of a reproduced signal.

An optimum value PMv1 is thus obtained for a recording parameter corresponding to the linear velocity v1 after learning. The optimum value PMv1 is generally different from the before-learning initial value f(v1) approximated based on a recording parameter recorded in the optical disc 101 (portion (a) of FIG. 4). This is because the optimum recording parameters (the position and the recording power level of a pulse sequence) vary depending on a combination of the optical disc 101 and the light spot diameter of the recording/reproduction apparatus 100.

In step 606: a line drawn by the recording parameter approximation function f(v), which passes through f(v1), is translated to a line passing through PMv1. An approximation function after translation (post-translation approximation function) is represented by:

$$f(v)+PMv1-f(v1).$$

In step 607: A recording parameter, (g(v)) corresponding to an arbitrary linear velocity v, is calculated based on the post-translation approximation function, and an adjustment value of the recording parameter corresponding to the arbitrary linear velocity v by:

$$g(v)=f(v)+PMv1-f(v1)+Adj(v).$$

Adj(v) is the adjustment value for the recording parameter corresponding to the arbitrary linear velocity v. The details of Adj(v) will be described below.

A solid line shown in portion (b) of FIG. 4 indicates a line drawn by g(v). A dotted line shown in portion (b) of FIG. 4 indicates a line drawn by f(v). The line of g(v) matches the translated f(v).

The approximation function g(v) for a recording parameter, corresponding to an arbitrary linear velocity v, can be used to obtain a recording parameter approximation value g(va), a recording parameter approximation value g(v2), and a recording parameter approximation value g(vb) corresponding to the linear velocity va, the linear velocity v2, and the linear velocity vb, respectively (portion (b) of FIG. 4). The linear velocities va, v2, and vb are linear velocities other than the linear velocity v1 used in the recording parameter learning.

As described above, after recording parameter learning is performed only for the linear velocity v1, a recording parameter corresponding to an arbitrary linear velocity can be obtained over a whole range of linear velocities (va≦v≦vb) in accordance with g(v).

Hereinafter, the adjustment value Adj(v) will be described.

Within the range of the varying linear velocities, a value of a recording parameter corresponding to a linear velocity, which is approximated by a post-translation approximation function (=f(v)+PMv1−f(v1)), may be different from its optimum value. In this case, when such a post-translation approximation function is used for recording, the jitter value of a reproduced signal may not reach the reference value of a recording/reproduction apparatus. It is now assumed that the light spot diameter of a reference recording machine which has recorded a recording parameter onto the optical disc 101 is different from the light spot diameter of the recording/reproduction apparatus 100. In this case, when a recording parameter is changed based on a single linear velocity for which recording parameter learning has been performed, a recording parameter corresponding to the linear velocity va, and the recording parameter corresponding to the linear velocity vb, among linear velocities in the varying range (va≦v≦vb) significantly depart from their respective optimum values. In order to reduce such a difference from the optimum value, the adjustment value Adj (v) is added to the post-translation approximation function to obtain g(v).

An exemplary method for adjusting the post-translation approximation function is to perform recording parameter learning for the linear velocity va and the linear velocity vb, which have a significant difference in a recording parameter, among linear velocities within the varying range (va≦v≦vb). Note that recording parameter learning does not need to be additionally performed for all linear velocities. For example, if only the rising position Tsfp of the beginning pulse of a pulse sequence and the falling position Telp of the terminating pulse are optimized, the jitter value of a reproduce signal is, in most cases, below the reference of the recording/reproduction apparatus 100.

Alternatively, in some cases, if the rising position Tsfp and the falling position Telp are optimized only for a pulse having the shortest mark length (3 T for DVD-RAM), the jitter value of a reproduce signal recording/reproduction apparatus 100 is below the reference.

In step 608: Based on the approximation function g(v), the recording position and the recording power level of a pulse sequence corresponding to a linear velocity v are calculated. The results of calculation are stored in a storage region of the system control circuit 102.

In step 609: The optical head 106 is moved to seek a recording region on the optical disc 101. The linear velocity setting circuit 108 sets the rotational speed of the spindle motor 107 to be the linear velocity v of the optical disc 101.

In step 610: The clock setting circuit 111 generates a recording clock Tv corresponding to the linear velocity v, with which information is recorded, and inputs the recording clock Tv into the pulse sequence generating circuit 104. The pulse sequence generating circuit 104 generates a pulse sequence.

In step 611: The generated pulse sequence is input into the laser drive circuit 105. Thereafter, a semiconductor laser apparatus carried by the optical head 106 is driven based on the pulse sequence.

In step 612: data is recorded into a recording region possessed by the optical disc 101. After recording, the process is stopped.

An embodiment of the present invention has been heretofore described with reference to FIGS. 1, 4 and 5.

For example, in the embodiment of FIGS. 1, 4 and 5, steps 601 to 610 correspond to a "step for generating a plurality of pulse sequences corresponding to a plurality of linear velocities". Steps 611 and 612 correspond to a "step for, while rotating a recording medium with a linear velocity selected from a plurality of linear velocities, forming at least one of a recording mark and a space by irradiating the recording medium with a pulse sequence selected from a plurality of pulse sequences, the pulse sequence corresponding to the linear velocity". Steps 601 to 605 correspond to a "step for measuring at least one first recording parameter corresponding to at least one of a plurality of linear velocities". Steps 606 to 608 correspond to a "step for determining a second recording parameter corresponding to a plurality of linear velocities based on the at least one first recording parameter measured". Steps 609 and 610 correspond to a "step for generating a plurality of pulse sequences corresponding to a plurality of linear velocities based on the determined second recording parameter". Further, steps 606 and 607 correspond to a "step for determining a fourth recording parameter corresponding to a plurality of linear velocities based on at least one third recording parameter recorded on a recording medium". Step 608 corresponds to a "step for determining the second parameter based on the measured at least one first recording parameter and fourth recording parameter".

However, the first procedure of the present invention is not limited to the embodiment of FIGS. 1, 4 and 5. The first procedure of the present invention has any configuration as long as it comprises the above-described steps, i.e., the "step for generating a plurality of pulse sequences corresponding to a plurality of linear velocities"; the "step for, while rotating a recording medium with a linear velocity selected from a plurality of linear velocities, forming at least one of a recording mark and a space by irradiating the recording medium with a pulse sequence selected from a plurality of pulse sequences, the pulse sequence corresponding to the linear velocity"; the "step for measuring at least one first recording parameter corresponding to at least one of a plurality of linear velocities"; the "step for determining a second recording parameter corresponding to a plurality of linear velocities based on the at least one first recording parameter measured"; the "step for generating a plurality of pulse sequences corresponding to a plurality of linear velocities based on the determined second recording parameter"; the "step for determining a fourth recording parameter corresponding to a plurality of linear velocities based on at least one third recording parameter recorded on a recording medium"; and the "step for determining the second parameter based on the measured at least one first recording parameter and fourth recording parameter".

According to the recording method, the recording apparatus and the recording medium of the present invention, it is possible to generate a correct pulse sequence quickly. This is because the present invention does not rely only on measured recording parameters, which are correct and require a long time to measure, and the present invention does not rely only on recording parameters already recorded on a recording medium, which are not correct and require no measurement time.

By approximating a recording parameter corresponding to an arbitrary linear velocity v based on an approximation function f(v) for the recording parameter described in a control track (CT) and an approximation function g(v) obtained based on the result of recording parameter learning of f(v1) for the linear velocity v1, an appropriate recording parameter, corresponding to an arbitrary linear velocity, can be obtained over a whole range of linear velocities after recording parameter learning is performed only for the linear velocity v1.

Therefore, even when DVD-RAM or the like is subjected to high density and high speed CAV recording, an optimum recording power level and pulse sequence can be determined at an arbitrary linear velocity, resulting in constant satisfactory recording.

3. Optimization of Recording Parameters by a Second Procedure

Figure 6:
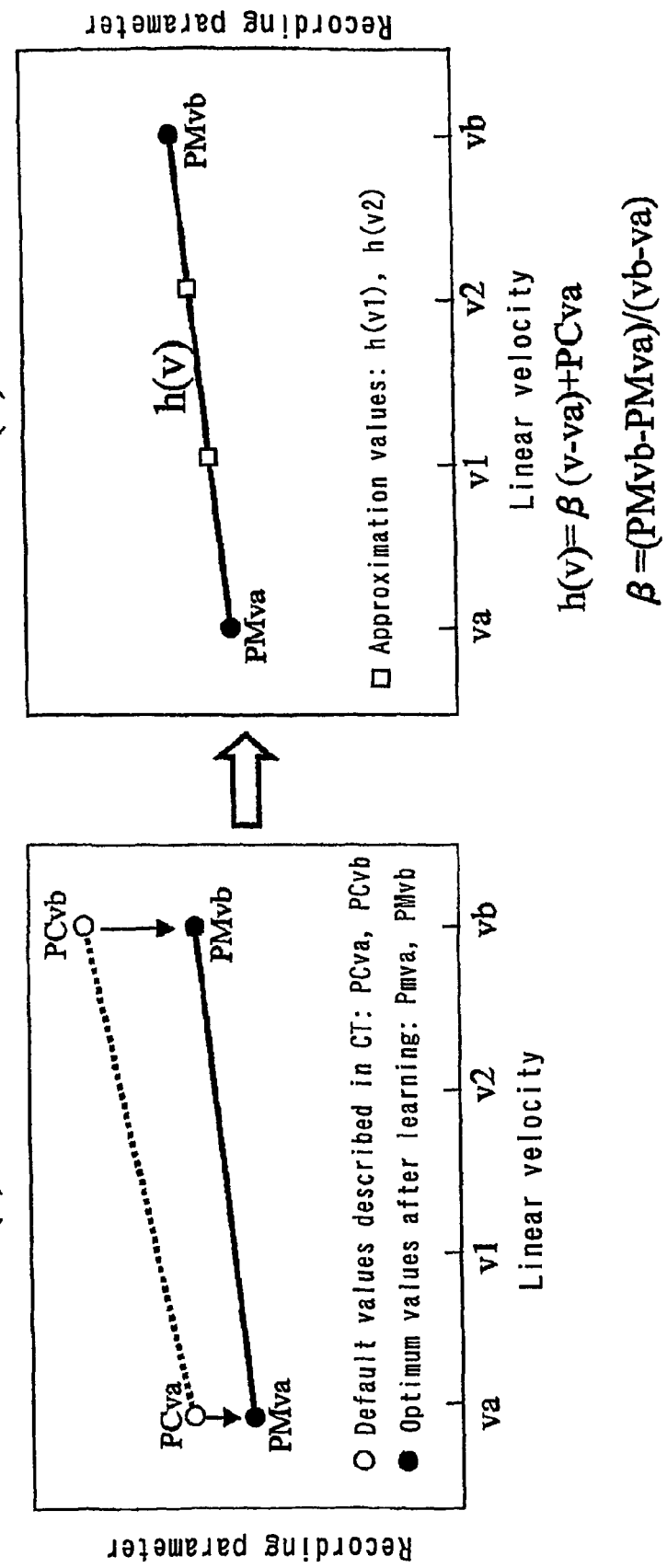
FIG. 6 is a diagram showing a relationship between linear velocities and a recording parameter to be optimized by a second procedure.

FIG. 6 is a diagram showing a relationship between linear velocities and a recording parameter to be optimized by a second procedure. Portion (a) of FIG. 6 shows a relationship between linear velocities and the recording parameter before optimization by the second procedure. Portion (b) of FIG. 6 shows a relationship between linear velocities and the recording parameter after optimization by the second procedure.

FIG. 7 is a flowchart showing the second procedure for optimizing a recording parameter. The second procedure is executed by the recording/reproduction apparatus 100.

Hereinafter, the second procedure for optimizing a recording parameter will be described with reference to FIGS. 1, 6 and 7 step by step.

In step 701: Values described in a control track are read and transferred to a memory region of the system control circuit 102. The values described in the control track are, for example, recording parameters previously recorded in a control track (CT) region possessed by the optical disc 101 (e.g., at least one of a position and a recording power level of a pulse sequence).

The recording parameters previously recorded in the control track (CT) region are, for example, a recording parameter PCva corresponding to the lowest linear velocity va and a recording parameter PCvb corresponding to the highest linear velocity vb.

Note that the recording parameters previously recorded in the control track (CT) region are not limited to the recording parameter PCva and the recording parameter PCvb. The recording parameters previously recorded in the control track (CT) region are, for example, the recording parameter PCva, the recording parameter PCvb, and a recording parameter PCvc. The recording parameter PCvc is a recording parameter corresponding to a linear velocity vc (vc=(va+vb)/2).

Also, the recording parameters previously recorded in the control track (CT) region may be optional recording parameters corresponding to n linear velocities. For example, the previously recorded recording parameters may be recording parameters corresponding to three linear velocities (v1, v2, v3). In this case, for example, va≦v1<v2<v3≦vb is satisfied.

The recording parameters previously recorded in the control track (CT) region themselves may not be read. Instead, recording parameters corresponding to linear velocities stored in the system control circuit 102 or the like may be selected based on identification codes previously recorded in the control track (CT) region. The identification code may be given for each disk type, or each production lot of each medium maker, in order to select an optimum recording parameter for each disk type or each production lot of each medium maker.

In step 702: a recording parameter PCva corresponding to the lowest linear velocity va and the recording parameter PCvb corresponding to the highest linear velocity vb, which have been previously recorded in the control track (CT), are set in the recording/reproduction apparatus 100. For example, the position of each pulse contained in the recording parameter PCva (e.g., the position of a starting pulse or the position of a terminating pulse) is set in the pulse sequence generating circuit 104 and the recording power levels contained in the recording parameter PCva are set in the laser power control circuit 115.

In step 703: The optical head 106 is moved to seek a prescribed test recording region provided on optical disc 101. The rotational speed of the spindle motor 107 is set to be the linear velocity va. The linear velocity va is used for the recording parameter learning, and is set by the linear velocity setting circuit 108.

Further, the clock setting circuit 111 generates a recording clock Tva corresponding to the linear velocity va, and inputs the recording clock Tva to the pulse sequence generating circuit 104.

In step 704: The recording parameter PCva corresponding to the linear velocity va is used to perform recording parameter learning to optimize the recording parameter.

To optimize a pulse sequence corresponding to the linear velocity va, the pulse sequence generating circuit 104 changes the rising position Tsfp of the starting pulse and the falling position Telp of the terminating pulse.

The pulse sequence generating circuit 104 optimizes the position Tsfp based on the mark length of a recording mark formed by a pulse sequence and the space length of a space adjacent to the front of the recording mark. The pulse sequence generating circuit 104, also optimizes the position Telp based on the mark length of a recording mark formed by a pulse sequence, and the space length of a space adjacent to the rear of the recording mark.

The degree (optimization index) of optimization of the position Tsfp and the position Telp can be determined by using at least one of the jitter detecting circuit 113 and the BER detecting circuit 114. For example, the pulse sequence generating circuit 104 changes the position Tsfp and the position Telp in a manner to minimize the jitter value or the BER value of a reproduced signal.

The laser power control circuit 115 optimizes the peak power level Pp, the erase power level Pe, the bias power level Pb, and the recording power level coefficient k, by recording parameter learning so as to determine a recording power level of a pulse sequence forming an appropriate recording mark and an appropriate space.

The degree of optimization of the recording power levels and the recording power level coefficient (optimization index) can be determined by using at least one of the jitter detecting circuit 113 and the BER detecting circuit 114. The pulse sequence generating circuit 104, changes the recording power levels and the recording power level coefficient in a manner to minimize the jitter value, or the BER value, of a reproduced signal.

A post-learning optimum value PMva is thus obtained for a recording parameter corresponding to the linear velocity va after learning. The post-learning optimum value PMva is generally different from the recording parameter PCva recorded in the optical disc 101 (portion (a) of FIG. 6). This is because the optimum recording parameters (the position and the recording power level of a pulse sequence) vary depending on a combination of the optical disc 101 and the light spot diameter of the recording/reproduction apparatus 100.

In step 705: The optical head 106 is moved to seek a prescribed test recording region provided on the optical disc 101. The rotational speed of the spindle motor 107 is set to be the linear velocity vb. The linear velocity vb is used for performing recording parameter learning in the linear velocity setting circuit 108 after the linear velocity va.

Further, the clock setting circuit 111 generates a recording clock Tvb corresponding to the linear velocity vb, and inputs the recording clock Tvb to the pulse sequence generating circuit 104.

In step 706: The recording parameter PCvb corresponding to the linear velocity vb is used to perform recording parameter learning to optimize the recording parameter.

A method for optimizing a pulse sequence corresponding to the linear velocity vb is the same as the method for the linear velocity va described in step 704. Therefore, the description thereof is omitted.

Thus, the post-learning optimum value PMvb, which is a recording parameter corresponding to the linear velocity vb after learning, is obtained. The post-learning optimum value PMvb is generally different from the recording parameter PCvb recorded on the optical disc 101 (portion (a) of FIG. 6). This is because the optimum recording parameters (the position and the recording power level of a pulse sequence) vary depending on a combination of the optical disc 101 and the light spot diameter of the recording/reproduction apparatus 100.

In step 707: Based on PMva and PMvb, a recording parameter corresponding to an arbitrary linear velocity v is obtained using a recording parameter approximation function h(v) represented by:

$$h(v) = \beta \cdot (v - va) + PMva$$

$$\beta = (PMvb - PMva)/(vb - va).$$

The recording parameter approximation function h(v) matches a characteristic of a recording medium. For example, the recording parameter approximation function h(v) can perform a linear approximation of a recording parameter, depending on a linear velocity. However, the recording parameter approximation function h(v) is not limited to a linear function. The recording parameter approximation function h(v) may be a quadratic function. The recording parameter approximation function h(v) may be selected, depending on a characteristic of a recording medium.

The approximation function h(v) for a recording parameter corresponding to an arbitrary linear velocity v, can be used to obtain a recording parameter approximation value h(v1) and a recording parameter approximation value h(v2) corresponding to the linear velocities v1 and v2, respectively (portion (b) of FIG. 6).

As described above, after recording parameter learning is performed only for the linear velocity va and the linear velocity vb, a recording parameter corresponding to an arbitrary linear velocity can be obtained over a whole range of linear velocities (va≦v≦vb) in accordance with h (v).

In step 708: Based on the approximation function h(v), the recording position and the recording power level of a pulse sequence corresponding to a linear velocity v are calculated. The results of calculation are stored in a storage region of the system control circuit 102.

In step 709: The optical head 106 is moved to seek a recording region on the optical disc 101. The linear velocity setting circuit 108 sets the rotational speed of the spindle motor 107 to be the linear velocity v of the optical disc 101.

In step 710: The clock setting circuit 111 generates a recording clock Tv corresponding to the linear velocity v, with which information is recorded, and inputs the recording clock Tv into the pulse sequence generating circuit 104. The pulse sequence generating circuit 104 generates a pulse sequence.

In step 711: The generated pulse sequence is input into the laser drive circuit 105. Thereafter, a semiconductor laser apparatus carried by the optical head 106 is driven based on the pulse sequence.

In step 712: data is recorded into a recording region possessed by the optical disc 101. After recording, the process is stopped.

An embodiment of the present invention has been heretofore described with reference to FIGS. 1, 6 and 7.

For example, in the embodiment of FIGS. 1, 6 and 7, steps 701 to 710 correspond to a "step for generating a plurality of pulse sequences corresponding to a plurality of linear velocities". Steps 711 and 712 correspond to a "step for, while rotating a recording medium with a linear velocity selected from a plurality of linear velocities, forming at least one of a recording mark and a space by irradiating the recording medium with a pulse sequence selected from a plurality of pulse sequences, the pulse sequence corresponding to the linear velocity". Steps 701 to 706 correspond to a "step for measuring at least one first recording parameter corresponding to at least one of a plurality of linear velocities". Steps 707 and 708 correspond to a "step for determining a second recording parameter corresponding to a plurality of linear velocities based on the at least one first recording parameter measured" and a "step for determining a second recording parameter h(v) corresponding to a plurality of linear velocities v based on the at least one first recording parameter measured". Steps 709 and 710 correspond to a "step for generating a plurality of pulse sequences corresponding to a plurality of linear velocities based on the determined second recording parameter".

However, the second procedure of the present invention is not limited to the embodiment of FIGS. 1, 6 and 7. The second procedure of the present invention has any configuration as long as it comprises the above-described steps, i.e., the "step for generating a plurality of pulse sequences corresponding to a plurality of linear velocities"; the "step for, while rotating a recording medium with a linear velocity selected from a plurality of linear velocities, forming at least one of a recording mark and a space by irradiating the recording medium with a pulse sequence selected from a plurality of pulse sequences, the pulse sequence corresponding to the linear velocity"; the "step for measuring at least one first recording parameter corresponding to at least one of a plurality of linear velocities"; the "step for determining a second recording parameter corresponding to a plurality of linear velocities based on the at least one first recording parameter measured"; the "step for generating a plurality of pulse sequences corresponding to a plurality of linear velocities based on the determined second recording parameter" and a "step for determining a second recording parameter h(v) corresponding to a plurality of linear velocities v based on the at least one first recording parameter measured".

According to the recording method, the recording apparatus and the recording medium of the present invention, it is possible to generate a correct pulse sequence quickly. This is because the present invention does not rely only on measured recording parameters, which are correct and require a long time to measure, and the present invention does not rely only on recording parameters already recorded on a recording medium, which are not correct and require no measurement time.

Recording parameter learning is performed based on recording parameters corresponding to two recording linear velocities described in the control track (CT). Based on the results, an approximation function h(v) for a recording parameter corresponding to an arbitrary linear velocity is obtained. Thus, after recording parameter learning is performed for only two linear velocities, an appropriate recording parameter corresponding to an arbitrary linear velocity can be obtained over a whole range of linear velocities.

Therefore, even when DVD-RAM or the like is subjected to high density and high speed CAV recording, an optimum recording power level and recording pulse sequence can be determined at an arbitrary linear velocity, resulting in constant satisfactory recording.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

INDUSTRIAL APPLICABILITY

According to the recording method, the recording apparatus and the recording medium of the present invention, it is possible to generate a correct pulse sequence quickly. This is because the present invention does not rely only on measured recording parameters, which are correct and require a long time to measure, and the present invention does not rely only on recording parameters already recorded on a recording medium, which are not correct and require no measurement time.

By approximating a recording parameter corresponding to an arbitrary linear velocity v based on an approximation function f(v) for the recording parameter described in a control track (CT) and an approximation function g(v) obtained based on the result of recording parameter learning of f(v1) for the linear velocity v1, an appropriate recording parameter corresponding to an arbitrary linear velocity can be obtained over a whole range of linear velocities after recording parameter learning is performed only for the linear velocity v1.

Recording parameter learning is performed based on recording parameters corresponding to two recording linear velocities described in the control track (CT). Based on the results, an approximation function h(v) for a recording parameter corresponding to an arbitrary linear velocity is obtained. Thus, after recording parameter learning is performed only for two linear velocities, an appropriate recording parameter corresponding to an arbitrary linear velocity can be obtained over a whole range of linear velocities.

Therefore, even when DVD-RAM or the like is subjected to high density and high speed CAV recording, an optimum recording power level and recording pulse sequence can be determined at an arbitrary linear velocity, resulting in constant satisfactory recording.

The invention claimed is:

1. A recording method comprising the steps of:
   (a) generating a plurality of pulse sequences for recording data to a recording medium corresponding to a plurality of linear velocities of rotation of the recording medium in the range va to vb;
   va being the lowest linear velocity;
   vb being the highest linear velocity,
   wherein each one of said plurality of pulse sequences having a starting pulse and a terminating pulse, the starting pulse being provided at a beginning thereof and the terminating pulse being provided at the end thereof;
   wherein the step (a) comprises the steps of:
   (a-1) providing, for each of the recording parameters, corresponding recording parameter values PCv1 and PCv2 for linear velocities v1 and v2 respectively, wherein v1 and v2 are linear velocities satisfying the relationship $va \leq v1 < v2 \leq vb$;
   (a-2) setting, for each of the recording parameters, the corresponding recording parameter values PCv1 and PCv2;
   (a-3) performing learning using said linear velocity v1 and the corresponding recording parameter value PCv1 and optimizing, for said linear velocity v1, to obtain a corresponding optimum recording parameter value PMv1 for each of the recording parameters;
   (a-4) performing learning using said linear velocity v2 and the corresponding recording parameter value PCv2 and optimizing, for said linear velocity v2, to obtain a corresponding optimum recording parameter value PMv2 for each of the recording parameters;
   (a-5) obtaining recording parameters corresponding to an arbitrary linear velocity v by using a corresponding recording parameter approximation function h(v) obtained based on PMv1 and PMv2;
   (b) while rotating a recording medium with a linear velocity v selected from the plurality of linear velocities in the range va to vb, forming at least one of a recording mark and a space by irradiating the recording medium with a pulse sequence selected from the plurality of pulse sequences, wherein the pulse sequence is determined by a set of recording parameters calculated from the corresponding recording parameter approximation function h(v).

2. A recording method according to claim 1, wherein:
   the linear velocity v1 is the linear velocity va and the linear velocity v2 is the linear velocity vb.

3. A recording method according to claim 1, wherein step (a-1) further comprises:
   providing, for each of the recording parameters, corresponding recording parameter value PCv3 for linear velocity v3, the linear velocity va, the linear velocity vb, the linear velocity v1, the linear velocity v2, and the linear velocity v3 have a relationship $va \leq v1 < v2 < v3 \leq vb$.

4. A recording method according to claim 1, wherein step (a-1) further comprises:
   providing, for each of the recording parameters corresponding recording parameter value PCv3 for linear velocity v3,
   wherein the linear velocity v1 is the linear velocity va, the linear velocity v2 is the linear velocity vb, and the linear velocity v3 is the linear velocity vc; and
   the linear velocity va, the linear velocity vb, and the linear velocity vc have a relationship $vc=(va+vb)/2$.

5. A recording method according to claim 1, wherein h(v) is a linear function or a quadratic function.

6. A recording method according to claim 1, wherein:
the optimum recording parameter PMv1 corresponds to the linear velocity v1 and the optimum recording parameter PMv2 corresponds to the linear velocity v2; and
the following relationship is satisfied:

$$va \leq v1 < v2 \leq vb,$$

$$h(v) = \beta \cdot (v-va) + PMv1,$$

and $$\beta = (PMv2 - PMv1)/(v2 - v1).$$

7. A recording method according to claim 1, wherein the recording parameter values PCv1 and PCv2 provided in step (a-1) are selected based on identification codes recorded on the recording medium.

8. A recording apparatus, comprising:
means for generating a plurality of pulse sequences for recording data to a recording medium corresponding to a plurality of linear velocities of rotation of the recording medium in the range va to vb;
va being the lowest linear velocity;
vb being the highest linear velocity,
wherein each one of said plurality of pulse sequences having a starting pulse and a terminating pulse, the starting pulse being provided at a beginning thereof and the terminating pulse being provided at the end thereof;
wherein the means for generating the plurality of pulse sequences are operable to:
provide, for each of the recording parameters, corresponding recording parameter values PCv1 and PCv2 for linear velocities v1 and v2 respectively, wherein v1 and v2 are linear velocities satisfying the relationship va≤v1<v2≤vb;
set, for each of the recording parameters, the corresponding recording parameter values PCv1 and PCv2;
perform learning using said linear velocity v1 and the corresponding recording parameter value PCv1 and optimizing, for said linear velocity v1, to obtain a corresponding optimum recording parameter value PMv1 for each of the recording parameters;
perform learning using said linear velocity v2 and the corresponding recording parameter value PCv2 and optimizing, for said linear velocity v2, to obtain a corresponding optimum recording parameter value PMv2 for each of the recording parameters;
obtain recording parameters corresponding to an arbitrary linear velocity v by using a corresponding recording parameter approximation function h(v) obtained based on PMv1 and PMv2;
means for, while rotating a recording medium with a linear velocity v selected from the plurality of linear velocities in the range va to vb, forming at least one of a recording mark and a space by irradiating the recording medium with a pulse sequence selected from the plurality of pulse sequences,
wherein the pulse sequence is determined by a set of recording parameters calculated from the corresponding recording parameter approximation function h(v).

9. A recording apparatus according to claim 8, wherein: the linear velocity v1 is the linear velocity va and the linear velocity v2 is the linear velocity vb.

10. A recording apparatus according to claim 8, wherein:
the recording parameter values PCv1 and PCv2, corresponding to linear velocities v1 and v2 respectively, are recording parameters values previously recorded on the recording medium; and
the linear velocity va, the linear velocity vb, the linear velocity v1, and the linear velocity v2 have a relationship va≤v1<v2≤vb.

11. A recording apparatus according to claim 8, wherein:
the recording parameter values PCv1 and PCv2, corresponding to linear velocities v1 and v2 respectively, are recording parameters values previously recorded on the recording medium; and
the linear velocity v1 is the linear velocity va and the linear velocity v2 is the linear velocity vb.

12. A recording apparatus according to claim 8, wherein:
the recording parameter values PCv1 and PCv2, corresponding to linear velocities v1 and v2 respectively, are recording parameters values previously recorded on the recording medium; and
h(v) is a linear function or a quadratic function.

13. A recording apparatus according to claim 8, wherein:
the recording parameter values PCv1 and PCv2, corresponding to linear velocities v1 and v2 respectively, are recording parameters values previously recorded on the recording medium;
the optimum recording parameter PMv1 corresponds to the linear velocity v1 and the optimum recording parameter PMv2 corresponds to the linear velocity v2; and
the following relationship is satisfied:

$$va \leq v1 < v2 \leq vb,$$

$$h(v)\beta \cdot (v-va) + PMv1,$$

and $$\beta = (PMv2 - PMv1)/(v2 - v1).$$

14. A recording medium, comprising:
a region in which at least one recording parameter value PCva is recorded, wherein a recording parameter approximation function f(v) corresponding to a plurality of linear velocities of rotation of the recording medium is determined based on the at least one recording parameter value PCva recorded on the recording medium;
a test recording region in which at least one optimum recording parameter value PMv1 corresponding to at least one linear velocity of the plurality of linear velocities is measured, wherein a recording parameter approximation function g(v) is determined based on the at least one optimum recording parameter value PMv1 and the recording parameter approximation function f(v); and
an information recording region in which at least one of a recording mark and a space is formed by, while rotating the recording medium with a linear velocity selected from the plurality of linear velocities, irradiating the recording medium with a pulse sequence selected from a plurality of pulse sequences for recording data to a recording medium, the plurality of pulse sequences corresponding to the plurality of linear velocities, wherein the pulse sequence is determined by recording parameter approximation function g(v),
wherein the recording parameter approximation function f(v), the optimum recording parameter value PMv1, and the recording parameter approximation function g(v) have a relationship represented by:

$$g(v) = f(v) + PMv1 - f(v1) + Adj(v)$$

where:
v represents the plurality of linear velocities;
v1 represents a linear velocity corresponding to one of the at least one third recording parameter; and
Adj(v) represents an adjustment value corresponding to the plurality of linear velocities.

15. A recording medium according to claim 14, wherein the recording medium has a region, in which an identification code for selecting the at least one third recording parameter is recorded.

* * * * *